US008984126B2

(12) United States Patent
Fujiwara

(10) Patent No.: US 8,984,126 B2
(45) Date of Patent: Mar. 17, 2015

(54) SERVICE COLLABORATION DEVICE, SERVICE COLLABORATION METHOD, AND COMPUTER-READABLE RECORDING MEDIUM

(75) Inventor: Takumi Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 13/616,062

(22) Filed: Sep. 14, 2012

(65) Prior Publication Data

US 2013/0117440 A1    May 9, 2013

(30) Foreign Application Priority Data

Nov. 9, 2011    (JP) .................................. 2011-245356

(51) Int. Cl.
| G06F 15/173 | (2006.01) |
| H04L 12/751 | (2013.01) |
| G06F 3/00 | (2006.01) |
| G06F 11/00 | (2006.01) |

(52) U.S. Cl.
CPC ...................................... *H04L 45/02* (2013.01)
USPC .............. 709/224; 370/235; 370/392; 710/29

(58) Field of Classification Search
None
See application file for complete search history.

(56) References Cited

U.S. PATENT DOCUMENTS

| 6,421,676 | B1 * | 7/2002 | Krishnamurthy et al. ............ 1/1 |
| 6,459,682 | B1 * | 10/2002 | Ellesson et al. ................ 370/235 |
| 6,901,462 | B2 * | 5/2005 | Minoshima et al. ............ 710/29 |
| 7,599,456 | B1 * | 10/2009 | Chi et al. ....................... 375/354 |
| 7,720,985 | B2 * | 5/2010 | Yoneda .......................... 709/231 |
| 8,782,307 | B1 * | 7/2014 | White et al. ..................... 710/56 |
| 2005/0041584 | A1 * | 2/2005 | Lau et al. ....................... 370/235 |
| 2007/0025242 | A1 * | 2/2007 | Tsang ............................ 370/229 |
| 2007/0058632 | A1 * | 3/2007 | Back et al. ..................... 370/392 |
| 2009/0327557 | A1 | 12/2009 | Sakurai |

FOREIGN PATENT DOCUMENTS

| JP | 2003078555 | * | 4/2003 |
| JP | 2008040718 | A | 2/2008 |
| JP | 2010003121 | A | 1/2010 |
| JP | 2010009218 | A | 1/2010 |
| JP | 2011113267 | A | 6/2011 |

* cited by examiner

Primary Examiner — Wen-Tai Lin
(74) Attorney, Agent, or Firm — Sughrue Mion, PLLC

(57) ABSTRACT

A service collaboration device 1 includes: a first determination unit 21 that determines whether or not the message triggers an inflow excess state based on a data amount of the message received from the collaboration source server and a data amount of the message transmitted to the collaboration target server; an augmentation instruction issuance unit 22 that, when the first determination unit 21 has determined that the inflow excess state is triggered, issues an augmentation instruction for augmenting a resource for the collaboration target server; a path change unit 32 that, when the augmentation instruction is issued, changes a path for transmitting the message to the collaboration target server to a path for transmitting the message to the collaboration target server after buffering the message; and a path addition unit 33 that adds a path for transmitting the buffered message to the resource augmented.

12 Claims, 18 Drawing Sheets

FIG.3

| INFLOW START TIME | OUTFLOW COMPLETION TIME | INFLOW DATA AMOUNT | OUTFLOW DATA AMOUNT |
|---|---|---|---|
| 2011/7/2 13:00:00 | 2011/7/2 13:01:00 | 30 MB | 40 MB |
| 2011/7/2 13:00:05 | 2011/7/2 13:02:05 | 30 MB | 30 MB |
| 2011/7/2 13:00:10 | 2011/7/2 13:03:10 | 30 MB | 45 MB |
| 2011/7/2 13:00:15 | 2011/7/2 13:05:15 | 30 MB | 50 MB |
| 2011/7/2 13:00:20 | 2011/7/2 13:10:20 | 30 MB | 80 MB |
| ⋮ | ⋮ | ⋮ | ⋮ |

FIG.4

| COLLABORATION SOURCE | COLLABORATION TARGET |
|---|---|
| COLLABORATION SOURCE SERVER | COLLABORATION TARGET SERVER |

FIG.5

| COLLABORATION SOURCE | COLLABORATION TARGET |
|---|---|
| COLLABORATION SOURCE SERVER | TEMPORARY STORAGE UNIT |
| TEMPORARY STORAGE UNIT | COLLABORATION TARGET SERVER |

FIG.6

| COLLABORATION SOURCE | COLLABORATION TARGET |
|---|---|
| COLLABORATION SOURCE SERVER | TEMPORARY STORAGE UNIT |
| TEMPORARY STORAGE UNIT | COLLABORATION TARGET SERVER |
| TEMPORARY STORAGE UNIT | AUGMENTED SERVER |

FIG.10

| INFLOW START TIME | OUTFLOW COMPLETION TIME | PROCESSING TIME PERIOD | INFLOW DATA AMOUNT | OUTFLOW DATA AMOUNT |
|---|---|---|---|---|
| 2011/7/2 13:00:00 | 2011/7/2 13:01:00 | 1 | 30 MB | 40 MB |
| 2011/7/2 13:00:05 | 2011/7/2 13:02:05 | 2 | 30 MB | 30 MB |
| 2011/7/2 13:00:10 | 2011/7/2 13:03:10 | 3 | 30 MB | 45 MB |
| 2011/7/2 13:00:15 | 2011/7/2 13:05:15 | 5 | 30 MB | 50 MB |
| 2011/7/2 13:00:20 | 2011/7/2 13:10:20 | 10 | 30 MB | 80 MB |
| ⋮ | ⋮ | ⋮ | ⋮ | ⋮ |

FIG.14

| INFLOW START TIME | OUTFLOW COMPLETION TIME | INFLOW DATA AMOUNT | OUTFLOW DATA AMOUNT | INFLOW EXCESS STATE |
|---|---|---|---|---|
| 2011/7/2 13:00:00 | 2011/7/2 13:01:00 | 30 MB | 40 MB | No |
| 2011/7/2 13:00:05 | 2011/7/2 13:02:05 | 30 MB | 30 MB | No |
| 2011/7/2 13:00:10 | 2011/7/2 13:03:10 | 30 MB | 45 MB | No |
| 2011/7/2 13:00:15 | 2011/7/2 13:05:15 | 30 MB | 50 MB | Yes |
| 2011/7/2 13:00:20 | 2011/7/2 13:10:20 | 30 MB | 80 MB | Yes |
| ⋮ | ⋮ | ⋮ | ⋮ | ⋮ |

SERVICE COLLABORATION DEVICE, SERVICE COLLABORATION METHOD, AND COMPUTER-READABLE RECORDING MEDIUM

CROSS-REFERENCE TO RELATED APPLICATION

This application is based upon and claims the benefit of priority from Japanese patent application No. 2011-245356, filed on Nov. 9, 2011, the disclosure of which is incorporated herein in its entirety by reference.

BACKGROUND OF THE INVENTION

1. Field of the Invention

The present invention relates to a service collaboration device, a service collaboration method, and a computer-readable recording medium.

2. Background Art

In general, when constructing a system using a Service-Oriented Architecture (SOA), collaboration among subsystems constituting the system is established in accordance with an enterprise service bus (ESB). For example, JP 2010-9218A discloses a system in which collaboration among a plurality of subsystems is established in accordance with the ESB.

However, in the system disclosed in JP 2010-9218A, when a part of the subsystems stops due to the occurrence of a failure, processing requests transmitted from other subsystems in operation may be stalled. In this case, after the failure is fixed, it is necessary to process the stalled processing requests in addition to normal processing requests that are routinely issued. Here, the stalled processing requests are processed within the range of what is left of the normal processing capacity. Therefore, an enormous amount of time is required to resolve the stalled processing requests.

This problem of stalled processing requests may be addressed by providing extra resources in anticipation of the stalled processing requests, and by making up a deficiency in the resources after the processing requests start to stall. For example, JP 2008-40718A and JP 2010-3121A disclose systems in which extra resources are provided in advance by preparing a plurality of servers.

More specifically, JP 2008-40718A discloses a load distribution control system that, upon receiving a request from a client, transfers the request to one of the plurality of prepared servers in which the number of requests standing by for responses is smaller than a threshold value.

On the other hand, JP 2010-3121A discloses a data transfer system that, upon receiving data to be processed from a data transmission device, determines a server to which the data to be processed should be transferred based on the operating statuses of the plurality of prepared servers and the status of a network.

However, the systems disclosed in JP 2008-40718A and JP2010-3121A are costly because they secure a large amount of resources in reserve at any time in preparation for failures. On the other hand, although the aforementioned action of making up a deficiency in the resources after the processing requests start to stall can solve the problem of cost, it renders the system operations unstable until the resources are augmented.

Incidentally, JP 2011-113267A discloses a configuration management system that changes a system configuration using resources of a data center in a cloud environment based on the status of prediction of the load on services. The configuration of the system disclosed in JP 2011-113267A is thought to solve the above problems of high cost and unstable operations.

However, in the system described in JP 2011-113267A, the operator is required to search for a snapshot of an appropriate system configuration based on the status of prediction of the load and to adopt the system configuration based on the snapshot obtained through the search. Hence, for example, if the operator does not have much operational experience, it may be troublesome for the operator to search for and adopt a system configuration, and moreover, the operator may adopt an inappropriate system configuration.

SUMMARY OF THE INVENTION

One example of the object of the present invention is to provide a service collaboration device, a service collaboration method, and a computer-readable recording medium that solve the aforementioned problems and enable appropriate changes in the resource environment in accordance with the status of the load on servers that operate in collaboration with one another.

In order to achieve the above object, a service collaboration device according to one aspect of the present invention transmits a message received from a collaboration source server to a collaboration target server, and includes: a first determination unit that determines whether or not the message triggers an inflow excess state based on a data amount of the message received from the collaboration source server and a data amount of the message transmitted to the collaboration target server; an augmentation instruction issuance unit that, when the first determination unit has determined that the inflow excess state is triggered, issues an augmentation instruction for augmenting a resource for the collaboration target server to the outside; a path change unit that, when the augmentation instruction issuance unit has issued the augmentation instruction, changes a path for transmitting the message to the collaboration target server to a path for transmitting the message to the collaboration target server after buffering the message; and a path addition unit that adds a path for transmitting the buffered message to the resource augmented in accordance with the augmentation instruction.

Furthermore, in order to achieve the above object, a service collaboration method according to one aspect of the present invention is a method for transmitting a message received from a collaboration source server to a collaboration target server, and includes: (a) a step of determining whether or not the message triggers an inflow excess state based on a data amount of the message received from the collaboration source server and a data amount of the message transmitted to the collaboration target server; (b) a step of, when step (a) has determined that the inflow excess state is triggered, issuing an augmentation instruction for augmenting a resource for the collaboration target server to the outside; (c) a step of, when step (b) has issued the augmentation instruction, changing a path for transmitting the message to the collaboration target server to a path for transmitting the message to the collaboration target server after buffering the message; and (d) a step of adding a path for transmitting the buffered message to the resource augmented in accordance with the augmentation instruction.

Furthermore, in order to achieve the above object, a computer-readable recording medium according to one aspect of the present invention has recorded therein a program for causing a computer to transmit a message received from a collaboration source server to a collaboration target server, the program including instructions that cause the computer to execute: (a) a step of determining whether or not the message triggers an inflow excess state based on a data amount of the message received from the collaboration source server and a data amount of the message transmitted to the collaboration target server; (b) a step of, when step (a) has determined that the inflow excess state is triggered, issuing an augmentation instruction for augmenting a resource for the collaboration target server to the outside; (c) a step of, when step (b) has issued the augmentation instruction, changing a path for transmitting the message to the collaboration target server to a path for transmitting the message to the collaboration target server after buffering the message; and (d) a step of adding a path for transmitting the buffered message to the resource augmented in accordance with the augmentation instruction.

As set forth above, the present invention can appropriately change the resource environment in accordance with the status of the load on servers that operate in collaboration with one another.

BRIEF DESCRIPTION OF THE DRAWINGS

FIG. 3 shows an example of the structure of data stored in a data amount storage unit in First Embodiment.

FIG. 4 shows an example of path information stored in a path information storage unit in First Embodiment.

FIG. 5 shows an example of the case where the path information stored in the path information storage unit has been changed in First Embodiment.

FIG. 6 shows an example of the case where a new path has been added to the path information stored in the path information storage unit in First Embodiment.

FIG. 10 shows an example of the structure of data stored in a data amount storage unit in a modification example of First Embodiment.

FIG. 14 shows an example of the structure of data stored in a data amount storage unit in Second Embodiment.

EXEMPLARY EMBODIMENT

The following describes preferred embodiments of a service collaboration device, a service collaboration method and a service collaboration program according to the present invention with reference to the accompanying drawings.
[First Embodiment]
(System Configuration)

Figure 1:
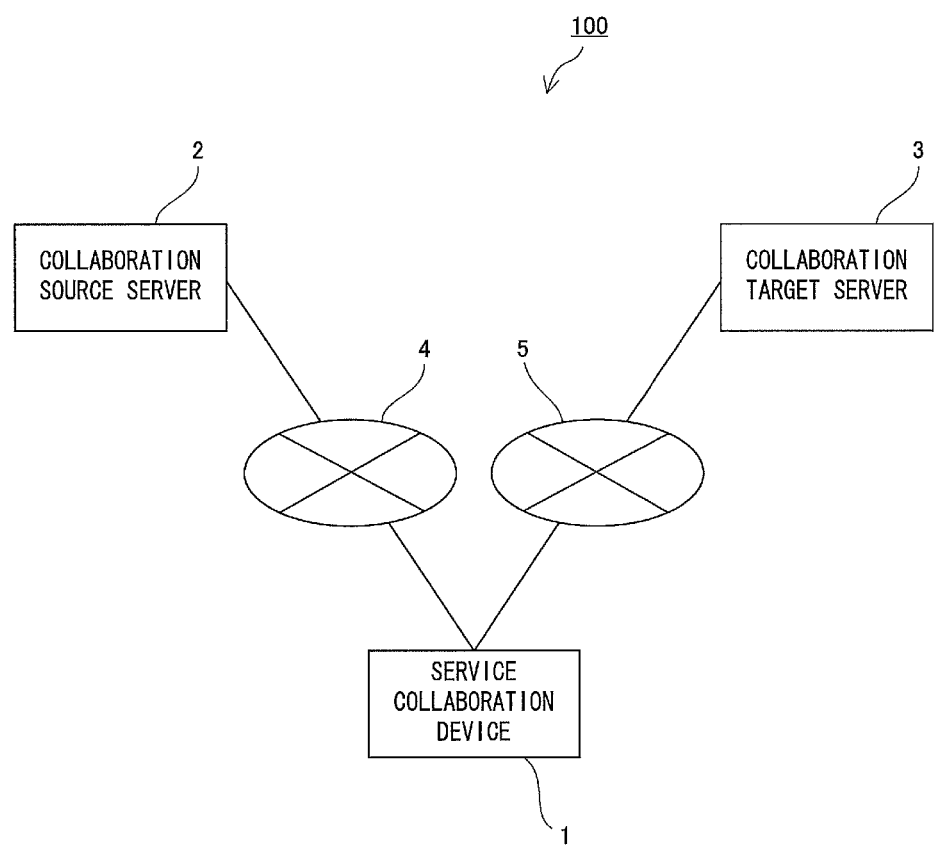
FIG. 1 shows an example of a system configuration of a service collaboration system.

First, a description is given of a configuration of a service collaboration system including a service collaboration device according to First Embodiment. FIG. 1 shows an example of a system configuration of the service collaboration system.

As shown in FIG. 1, a service collaboration system 100 includes a service collaboration device 1, a collaboration source server 2, and a collaboration target server 3. The service collaboration device 1 is connected to the collaboration source server 2 via a network 4, and to the collaboration target server 3 via a network 5. Note that the service collaboration device 1 may be connected to the collaboration source server 2 and the collaboration target server 3 via one network.

The service collaboration device 1 transmits a message received from the collaboration source server to the collaboration target server. The service collaboration device 1 may transfer the received message as-is to the collaboration target server, or may transmit the received message to the collaboration target server after processing data.
(Device Configuration)

Figure 2:
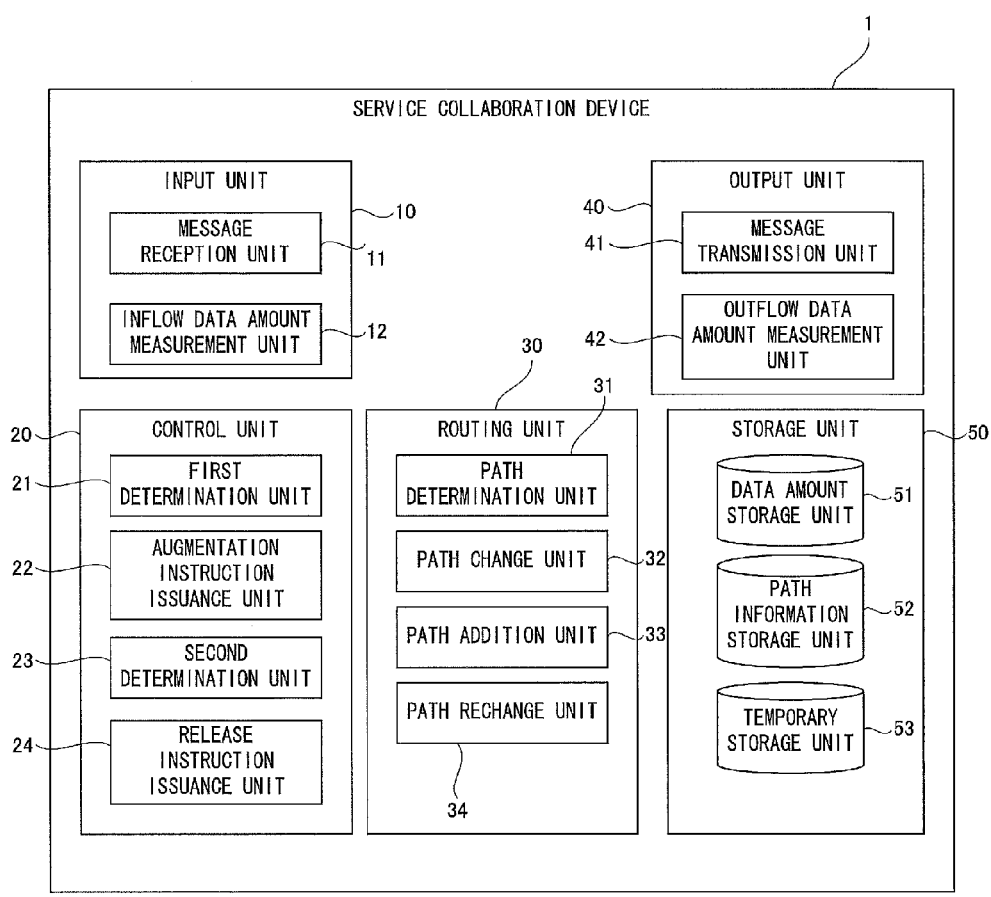
FIG. 2 shows an example of a functional configuration of a service collaboration device according to First Embodiment.

A description is now given of the functions and configuration of the service collaboration device 1 with reference to FIG. 2. FIG. 2 shows an example of a functional configuration of the service collaboration device according to First Embodiment. As shown in FIG. 2, the service collaboration device 1 mainly includes a first determination unit 21, an augmentation instruction issuance unit 22, a path change unit 32, and a path addition unit 33.

Based on the data amount of the message received from the collaboration source server 2 (hereinafter referred to as "inflow data amount") and the data amount of the message transmitted to the collaboration target server 3 (hereinafter referred to as "outflow data amount"), the first determination unit 21 determines whether or not the message triggers an inflow excess state. The inflow excess state denotes the state in which the inflow data amount exceeds the outflow data amount. When the first determination unit 21 has determined that the inflow excess state is triggered, the augmentation instruction issuance unit 22 issues an augmentation instruction for augmenting a resource for the collaboration target server 3 to the outside.

When the augmentation instruction issuance unit 22 has issued the augmentation instruction, the path change unit 32 changes a path for transmitting the message to the collaboration target server 3 to a path for transmitting the message to the collaboration target server 3 after buffering the message. Furthermore, the path addition unit 33 adds a new path for transmitting the buffered message to the resource that has been augmented in accordance with the augmentation instruction.

In this way, the first determination unit 21 in the service collaboration device 1 according to the present embodiment can identify the status of the load on the servers that operate in collaboration with one another. Also, the augmentation instruction issuance unit 22, the path change unit 32, and the path addition unit 33 in the service collaboration device 1 can appropriately change the resource environment in accordance with the identified status of the load. As a result, even if the operator does not have much operational experience, the operator can adopt an appropriate system configuration without finding it troublesome to search for and adopt the system configuration.

The following is a more specific description of the functions and configuration of the service collaboration device 1 with reference to FIGS. 3 to 6 in addition to FIG. 2. As shown in FIG. 2, the service collaboration device 1 includes an input unit 10, a control unit 20, a routing unit 30, an output unit 40, and a storage unit 50. Note that the first determination unit 21 and the augmentation instruction issuance unit 22 are included in the control unit 20 as will be described later. The path change unit 32 and the path addition unit 33 are included in the routing unit 30 as will be described later.

The storage unit 50 stores data that is referenced and updated by various constituent elements. The storage unit 50 includes, for example, a data amount storage unit 51, a path information storage unit 52, and a temporary storage unit 53. The temporary storage unit 53 can temporarily store a message, and is used for buffering a message as mentioned above.

The following describes the structure of data stored in the data amount storage unit 51 with reference to FIG. 3. FIG. 3 shows an example of the structure of data stored in the data amount storage unit in First Embodiment.

As shown in FIG. 3, the data amount storage unit 51 stores various types of data under data items such as an inflow start time, an outflow completion time, an inflow data amount, and an outflow data amount. To be more specific, the time at which reception of the message from the collaboration source server 2 is started is stored under the data item "inflow start time". The time at which transmission of the message to the collaboration target server 3 is completed is stored under the data item "outflow completion time". The data amount of the message received from the collaboration source server 2 is stored under the data item "inflow data amount". The data amount of the message transmitted to the collaboration target server 3 is stored under the data item "outflow data amount".

The following describes the structure of data stored in the path information storage unit 52 with reference to FIG. 4. FIG. 4 shows an example of path information stored in the path information storage unit in First Embodiment.

The path information storage unit 52 stores path information for identifying a path that has been determined and changed by the routing unit 30. In the example of FIG. 4, the path information is stored under separate data items such as a collaboration source and a collaboration target, for example. To be more specific, information for identifying the element of initiation of the path is stored under the data item "collaboration source". Information for identifying the element of termination of the path is stored under the data item "collaboration target". In the example shown in FIG. 4, the path information stored in the path information storage unit 52 identifies the path from the collaboration source server 2 to the collaboration target server 3.

The input unit 10 shown in FIG. 2 includes a message reception unit 11 and an inflow data amount measurement unit 12.

The message reception unit 11 receives the message transmitted from the collaboration source server 2. Upon receiving the message, the message reception unit 11 stores the time at which reception of the message is started under the data item "inflow start time" in the data amount storage unit 51.

The inflow data amount measurement unit 12 measures the inflow data amount, that is to say, the data amount of the message that the message reception unit 11 has received. The inflow data amount measurement unit 12 stores the inflow data amount under the data item "inflow data amount" in the data amount storage unit 51.

The control unit 20 further includes a second determination unit 23 and a release instruction issuance unit 24 in addition to the first determination unit 21 and the augmentation instruction issuance unit 22 mentioned above.

In the present embodiment, the first determination unit 21 determines whether or not the inflow excess state is triggered based on the inflow data amount and the outflow data amount stored in the data amount storage unit 51. To be more specific, the first determination unit 21 determines that the inflow excess state is triggered when the state in which the inflow data amount exceeds the outflow data amount is continuing. Conversely, the first determination unit 21 determines that the inflow excess state is not triggered when the state in which the inflow data amount exceeds the outflow data amount is not continuing. The duration of continuation that triggers the inflow excess state can be set as appropriate in consideration of the relationship between the duration of continuation and the inflow state from the past.

As mentioned earlier, when the first determination unit 21 has determined that the inflow excess state is triggered, the augmentation instruction issuance unit 22 issues the augmentation instruction for instructing the augmentation of the resource to the outside. The resource to be augmented may be any resource that can increase the processing capacity of the collaboration target server 3. Examples of the resource to be augmented include a server device and a virtual server device in a cloud environment. Examples of the outside to which the augmentation instruction is issued include the collaboration target server 3 and a management server that controls the entirety of the service collaboration system 100.

After the first determination unit 21 has determined that the inflow excess state is triggered, the second determination unit 23 determines whether or not the inflow excess state is resolved based on the inflow data amount and the outflow data amount stored in the data amount storage unit 51. To be more specific, the second determination unit 23 determines that the inflow excess state is resolved when the state in which both the inflow data amount and the outflow data amount are smaller than or equal to a set amount is continuing. Conversely, the second determination unit 23 determines that the inflow excess state is not resolved when the state in which both the inflow data amount and the outflow data amount are smaller than or equal to the set amount is not continuing. The duration of continuation that solves the inflow excess state can be set as appropriate in consideration of the relationship between the duration of continuation and the inflow state from the past. Furthermore, it suffices for the set amount that serves as a criterion for determination to be set based on normal throughputs of collaboration target servers.

When the second determination unit 23 has determined that the inflow excess state is resolved, the release instruction issuance unit 24 issues a release instruction for releasing the resource that has been augmented in accordance with the augmentation instruction to the outside.

The routing unit 30 further includes a path determination unit 31 and a path rechange unit 34 in addition to the path change unit 32 and the path addition unit 33 mentioned above.

The path determination unit 31 determines a path for transmitting the message to the collaboration target server 3. The path determination unit 31 stores path information for identifying the determined path in the path information storage unit 52.

In the present embodiment, when the first determination unit 21 has determined that the inflow excess state is triggered and the augmentation instruction has been issued, the path change unit 32 changes the path determined by the path determination unit 31 to a path for transmitting the message to the collaboration target server 3 via the temporary storage unit 53. The path change unit 32 updates the path information stored in the path information storage unit 52 to reflect the change.

FIG. 5 shows an example of the path information indicating the path obtained by changing the path information shown in FIG. 4. The example of FIG. 5 is for the case where the path information stored in the path information storage unit has been changed in First Embodiment. The post-change path information shown in FIG. 5 includes a path from the collaboration source server 2 to the temporary storage unit 53 and a path from the temporary storage unit 53 to the collaboration target server 3.

In the present embodiment, when the resource has been augmented in accordance with the augmentation instruction issued by the augmentation instruction issuance unit 22, the path addition unit 33 adds the augmented resource, e.g. the augmented server, to the path information storage unit 52 as the collaboration target to which the message stored in the temporary storage unit 53 is to be transmitted. That is to say, the path addition unit 33 adds path information indicating a path to the added resource to the path information stored in the path information storage unit 52.

FIG. 6 shows an example of the path information obtained by adding the path to the augmented resource to the path information shown in FIG. 5. The example of FIG. 6 is for the case where a new path has been added to the path information stored in the path information storage unit in First Embodiment. As shown in FIG. 6, the post-addition path information further includes a path from the temporary storage unit 53 to the augmented server in addition to the path from the collaboration source server 2 to the temporary storage unit 53 and the path from the temporary storage unit 53 to the collaboration target server 3.

When the second determination unit 23 has determined that the inflow excess state is resolved and the release instruction has been issued by the release instruction issuance unit 24, the path rechange unit 34 deletes the path added by the path addition unit 33, and restores the path changed by the path change unit 32 back to the pre-change path. The path rechange unit 34 updates the path information stored in the path information storage unit 52 by restoring it back to the path information indicating the path that was originally determined by the path determination unit 31. To be more specific, the path information shown in FIG. 6 is restored back to the path information shown in FIG. 4.

The output unit 40 includes a message transmission unit 41 and an outflow data amount measurement unit 42.

The message transmission unit 41 transmits the message to the collaboration target server 3 in accordance with the path information stored in the path information storage unit 52. The message transmission unit 41 stores the time at which the transmission of the message is completed under the data item "outflow completion time" in the data amount storage unit 51.

The outflow data amount measurement unit 42 measures the outflow data amount, that is to say, the data amount of the message transmitted by the message transmission unit 41. The outflow data amount measurement unit 42 stores the outflow data amount under the data item "outflow data amount" in the data amount storage unit 51.

(Device Operations)

Figure 7:
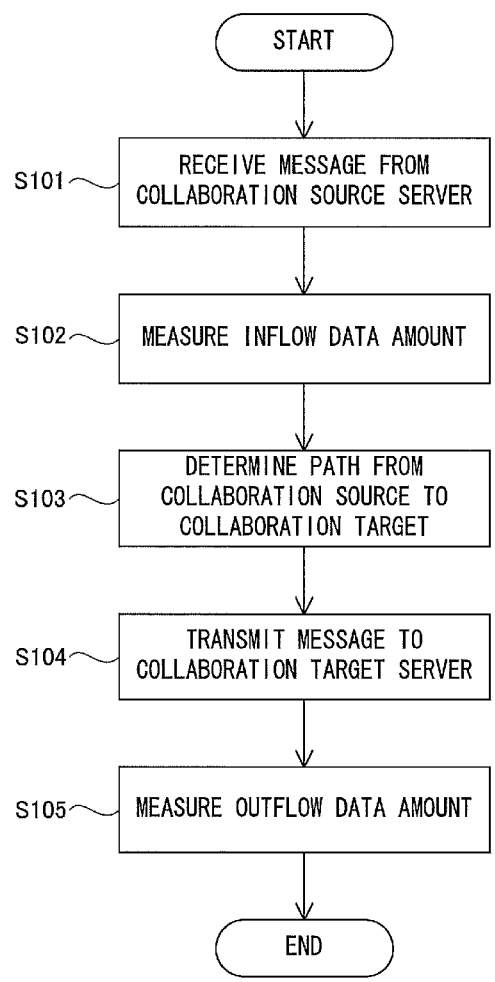
FIG. 7 is a flowchart showing the operations of the service collaboration device according to First Embodiment for storing data.
Figure 8:
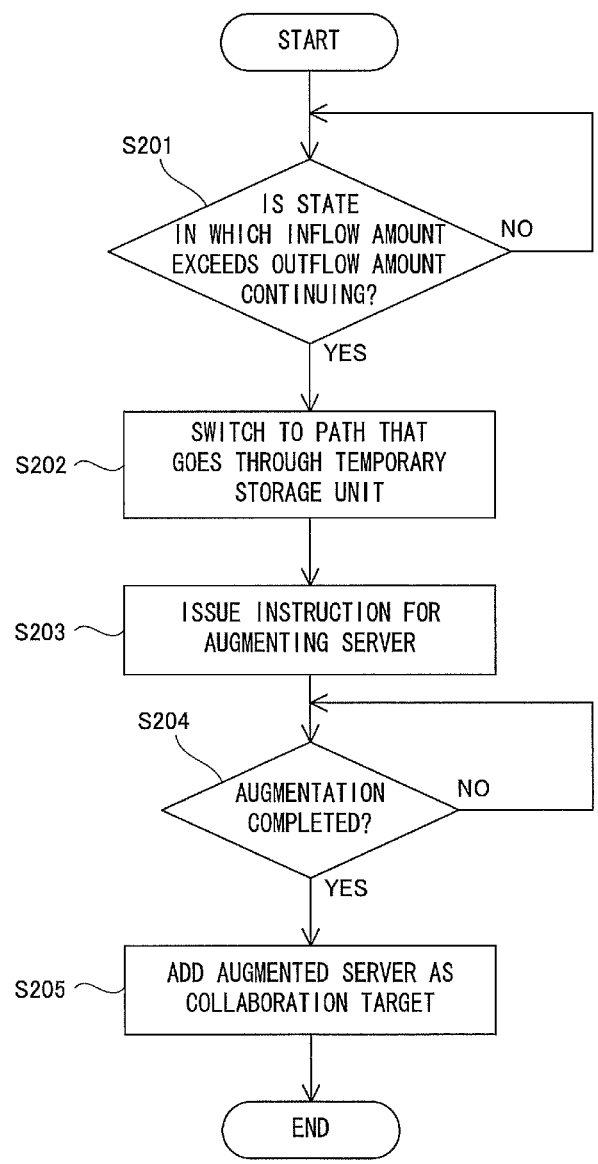
FIG. 8 is a flowchart showing the operations of the service collaboration device according to First Embodiment for augmenting a resource.
Figure 9:
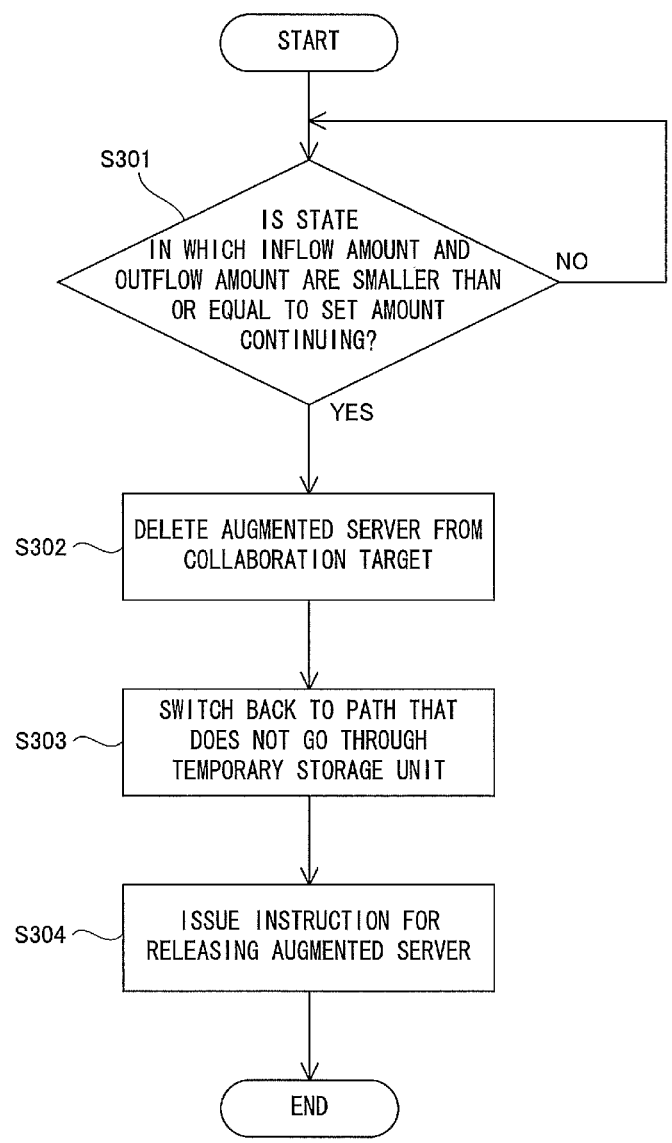
FIG. 9 is a flowchart showing the operations of the service collaboration device according to First Embodiment for releasing a resource.

The following describes the operations of the service collaboration device 1 according to First Embodiment with reference to FIGS. 7 to 9. The following description is given in consideration of FIGS. 1 to 6 as appropriate. In First Embodiment, the service collaboration method is implemented by causing the service collaboration device 1 to operate. Therefore, a description of the service collaboration method according to First Embodiment is encompassed within the following description of the operations of the service collaboration device 1.

First, a description is given of the operations of the service collaboration device according to First Embodiment for storing data with reference to FIG. 7. FIG. 7 is a flowchart showing the operations of the service collaboration device according to First Embodiment for storing data.

First, the message reception unit 11 receives a message from the collaboration source server 2 (step S101), and stores the time at which the reception of the message is started under the data item "inflow start time" in the data amount storage unit 51.

Next, the inflow data amount measurement unit 12 measures the inflow data amount of the message received in the aforementioned step S101 (step S102), and stores the inflow data amount under the data item "inflow data amount" in the data amount storage unit 51 (see FIG. 3).

Thereafter, the path determination unit 31 determines a path for transmitting the message from the collaboration source server 2 to the collaboration target server 3 (step S103), and stores path information for identifying the determined path in the path information storage unit 52 (see FIG. 4).

Subsequently, the message transmission unit 41 transmits the message to the collaboration target server 3 (step S104), and stores the time at which the transmission of the message is completed under the data item "outflow completion time" in the data amount storage unit 51 (see FIG. 3).

After that, the outflow data amount measurement unit 42 measures the outflow data amount of the message transmitted in the aforementioned step S104 (step S105), and stores the outflow data amount under the data item "outflow data amount" in the data amount storage unit 51 (see FIG. 3).

Next, a description is given of the operations of the service collaboration device according to First Embodiment for augmenting a resource with reference to FIG. 8. FIG. 8 is a flowchart showing the operations of the service collaboration device according to First Embodiment for augmenting a resource.

First, based on the inflow data amount and the outflow data amount stored in the data amount storage unit 51, the first determination unit 21 determines whether or not the state in which the inflow data amount exceeds the outflow data amount is continuing (step S201).

When the result of determination in the aforementioned step S201 is NO (the NO branch of step S201), step S201 is executed again after a predetermined time period has passed. On the other hand, when the result of determination in the aforementioned step S201 is YES (the YES branch of step S201), the path change unit 32 updates the path information in the path information storage unit 52 by changing the path that was determined by the path determination unit 31 in step S103 to a path for transmitting the message to the collaboration target server 3 via the temporary storage unit 53 (step S202) (see FIG. 5).

After the execution of step S202, the augmentation instruction issuance unit 22 issues an augmentation instruction for instructing the augmentation of a server to the outside (step S203).

Then, the augmentation instruction issuance unit 22 determines whether or not a server has been augmented in accordance with the augmentation instruction issued in the aforementioned step S203 (step S204).

When the result of determination in the aforementioned step S204 is NO (the NO branch of step S204), step S204 is executed again after a predetermined time period has passed. On the other hand, when the result of determination in the aforementioned step S204 is YES (the YES branch of step S204), the path addition unit 33 updates the path information in the path information storage unit 52 by adding the augmented server as the collaboration target to which the message stored in the temporary storage unit 53 is to be transmitted (step S205) (see FIG. 6).

Next, a description is given of the operations of the service collaboration device according to First Embodiment for releasing a resource with reference to FIG. 9. FIG. 9 is a flowchart showing the operations of the service collaboration device according to First Embodiment for releasing a resource.

First, based on the inflow data amount and the outflow data amount stored in the data amount storage unit 51, the second determination unit 23 determines whether or not the state in which both the inflow data amount and the outflow data amount are smaller than or equal to a set amount is continuing (step S301).

When the result of determination in the aforementioned step S301 is NO (the NO branch of step S301), step S301 is executed again after a predetermined time period has passed. On the other hand, when the result of determination in the aforementioned step S301 is YES (the YES branch of step S301), the path rechange unit 34 deletes the augmented server that was added in the aforementioned step S205 of FIG. 8 from the collaboration target in the path information storage unit 52 (step S302).

Furthermore, the path rechange unit 34 updates the path information in the path information storage unit 52 by restoring the path that was changed in the aforementioned step S202 of FIG. 8 back to the path that does not go through the temporary storage unit 53 (step S303).

Subsequently, the release instruction issuance unit 24 issues, to the outside, a release instruction for instructing the release of the server that was augmented in accordance with the augmentation instruction issued in the aforementioned step S203 of FIG. 8 (step S304).

(Program)

A service collaboration program according to First Embodiment may be any program that causes a computer to execute steps S101 to S105 shown in FIG. 7, steps S201 to S205 shown in FIG. 8, and steps S301 to S304 shown in FIG. 9. The service collaboration device 1 and the service collaboration method according to First Embodiment can be realized by installing and executing this program on the computer. In this case, a central processing unit (CPU) of the computer functions as the input unit 10, the control unit 20, the routing unit 30, and the output unit 40 and executes processing thereof. Furthermore, a storage device installed on the computer, such as a hard disk, may function as the storage unit 50.

(Effects of First Embodiment)

As has been described above, in the service collaboration device 1 according to First Embodiment, the path change unit 32 can switch to a path that goes through the temporary storage unit 53 when the first determination unit 21 has determined that the inflow excess state is triggered. Accordingly, when the message is stalled, processing for the collaboration target can be executed after storing the message in the temporary storage unit 53. This can reduce the capacity of the main storage device of the service collaboration device 1 which is secured for the case where the message is stalled.

Furthermore, in the service collaboration device 1 according to First Embodiment, when the first determination unit 21 has determined that the inflow excess state is triggered, the augmentation instruction issuance unit 22 issues an instruction for augmenting a server, and the path addition unit 33 can add the augmented server as the destination of the message stored in the temporary storage unit 53. Accordingly, when the message is stalled, the collaboration target and its processing capacity can be augmented promptly. This can shorten the amount of time required to resolve the stalling of the message.

Moreover, in the service collaboration device 1 according to First Embodiment, when the first determination unit 21 has determined that the inflow excess state is triggered, the path change unit 32 switches to a path via which the stalled message can be temporarily saved, and the augmentation instruction issuance unit 22 augments the resource in accordance with the requested amount. In addition, when the second determination unit 23 has determined that the inflow excess state is resolved, the path rechange unit 34 switches back to the original path with high processing efficiency, and the release instruction issuance unit 24 can release the augmented resource. In this way, the processing capacity can be changed in accordance with the status of the stalled message, and therefore the cost of the resource required when the message is stalled can be suppressed.

In the above manner, the service collaboration device 1 according to First Embodiment can appropriately change the resource environment in accordance with the status of the load.

(Modification Example)

In the above-described First Embodiment, the inflow data amount and the outflow data amount stored in the data amount storage unit 51 serve as the bases on which the first determination unit 21 determines whether or not the inflow excess state is triggered and the second determination unit 23 determines whether or not the inflow excess state is resolved. However, in First Embodiment, the above determinations are not limited to being made on those bases. For example, provided that a time period from the inflow start time to the outflow completion time stored in the data amount storage unit 51 is called a processing time period, a tendency of the processing time period to increase/decrease may serve as the basis on which the first determination unit 21 determines whether or not the inflow excess state is triggered and the second determination unit 23 determines whether or not the inflow excess state is resolved.

The extent of the tendency of the processing time period to increase/decrease that triggers the inflow excess state can be set as appropriate in consideration of the relationship between the tendency toward an increase and the inflow state from the past. Likewise, the extent of the tendency of the processing time period to increase/decrease that resolves the inflow excess state can be set as appropriate in consideration of the relationship between the tendency toward a decrease and the inflow state from the past.

In the present modification example, the processing time period may be calculated each time the determination is made, or may be calculated and stored in the data amount storage unit 51 ahead of time. FIG. 10 shows an example of the structure of data in the data amount storage unit 51 to which the processing time period has been added as an item. FIG. 10 shows an example of the structure of data stored in the data amount storage unit in the modification example of First Embodiment.

As shown in FIG. 10, in the present modification example, the data amount storage unit 51 further includes a data item "processing time period" in addition to the data items shown in FIG. 3. The data item "processing time period" stores a time period required from the start of the inflow to the completion of the outflow.

Figure 11:
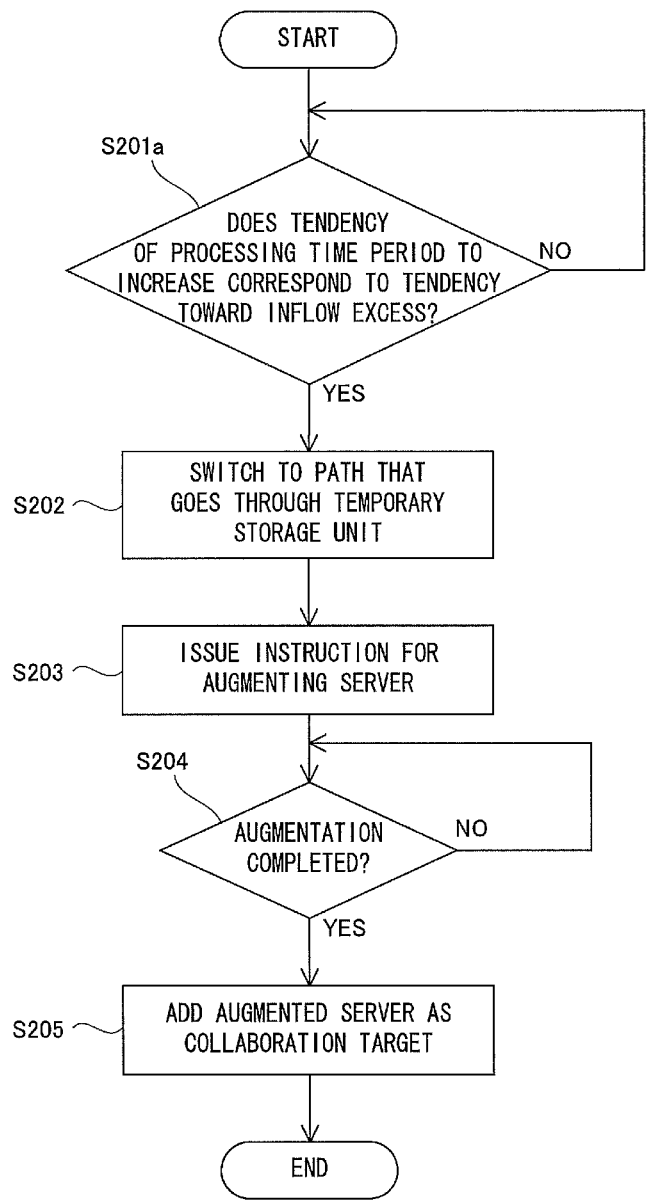
FIG. 11 is a flowchart showing the operations of a service collaboration device according to the modification example of First Embodiment for augmenting a resource.

The following describes the operations of the service collaboration device according to the modification example for augmenting a resource with reference to FIG. 11. FIG. 11 is a flowchart showing the operations of the service collaboration device according to the modification example of First Embodiment for augmenting a resource. The following description is given with a focus on step S201a, which is different from the operations for augmenting a resource shown in FIG. 8.

As shown in FIG. 11, in the present modification example, the first determination unit 21 determines whether or not a tendency of the processing time period to increase corresponds to a tendency toward the inflow excess based on the processing time period stored in the data amount storage unit 51 (step S201a).

When the result of determination in the aforementioned step S201a is NO (the NO branch of step S201a), step S201a is executed again after a predetermined time period has passed. On the other hand, when the result of determination in step S201a is YES (the YES branch of step S201a), the path change unit 32 changes the path determined by the path determination unit 31 to a path for transmitting the message to the collaboration target server 3 via the temporary storage unit 53 (step S202).

Note that step S202 shown in FIG. 11 is similar to step S202 shown in FIG. 8. The steps following step S202 shown in FIG. 11 are also similar to the steps following step S202 shown in FIG. 8. In FIG. 11, the steps that are the same as those shown in FIG. 8 are given the same step numbers thereas. A description of step S202 and the succeeding steps is omitted.

Figure 12:
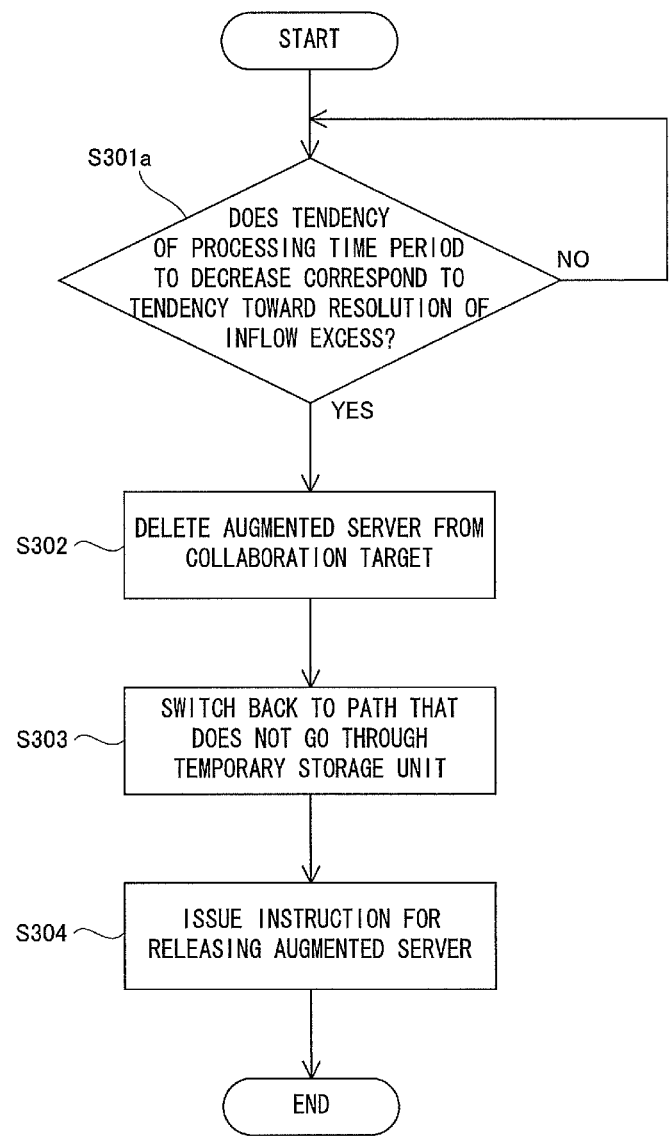
FIG. 12 is a flowchart showing the operations of the service collaboration device according to the modification example of First Embodiment for releasing a resource.

The following describes the operations of the service collaboration device according to the modification example for releasing a resource with reference to FIG. 12. FIG. 12 is a flowchart showing the operations of the service collaboration device according to the modification example of First Embodiment for releasing a resource. The following description is given with a focus on step S301a, which is different from the operations for releasing a resource shown in FIG. 9.

As shown in FIG. 12, in the present modification example, the second determination unit 23 determines whether or not a tendency of the processing time period to decrease corresponds to a tendency toward resolution of the inflow excess based on the processing time period stored in the data amount storage unit 51 (step S301a).

When the result of determination in the aforementioned step S301a is NO (the NO branch of step S301a), step S301a is executed again after a predetermined time period has passed. On the other hand, when the result of determination in step S301a is YES (the YES branch of step S301a), the path rechange unit 34 deletes the augmented server from the collaboration target (step S302).

Note that step S302 shown in FIG. 12 is similar to step S302 shown in FIG. 9. The steps following step S302 shown in FIG. 12 are also similar to the steps following step S302 shown in FIG. 9. In FIG. 12, the steps that are the same as those shown in FIG. 9 are given the same step numbers thereas. A description of step S302 and the succeeding steps is omitted.

(Second Embodiment)

Figure 13:
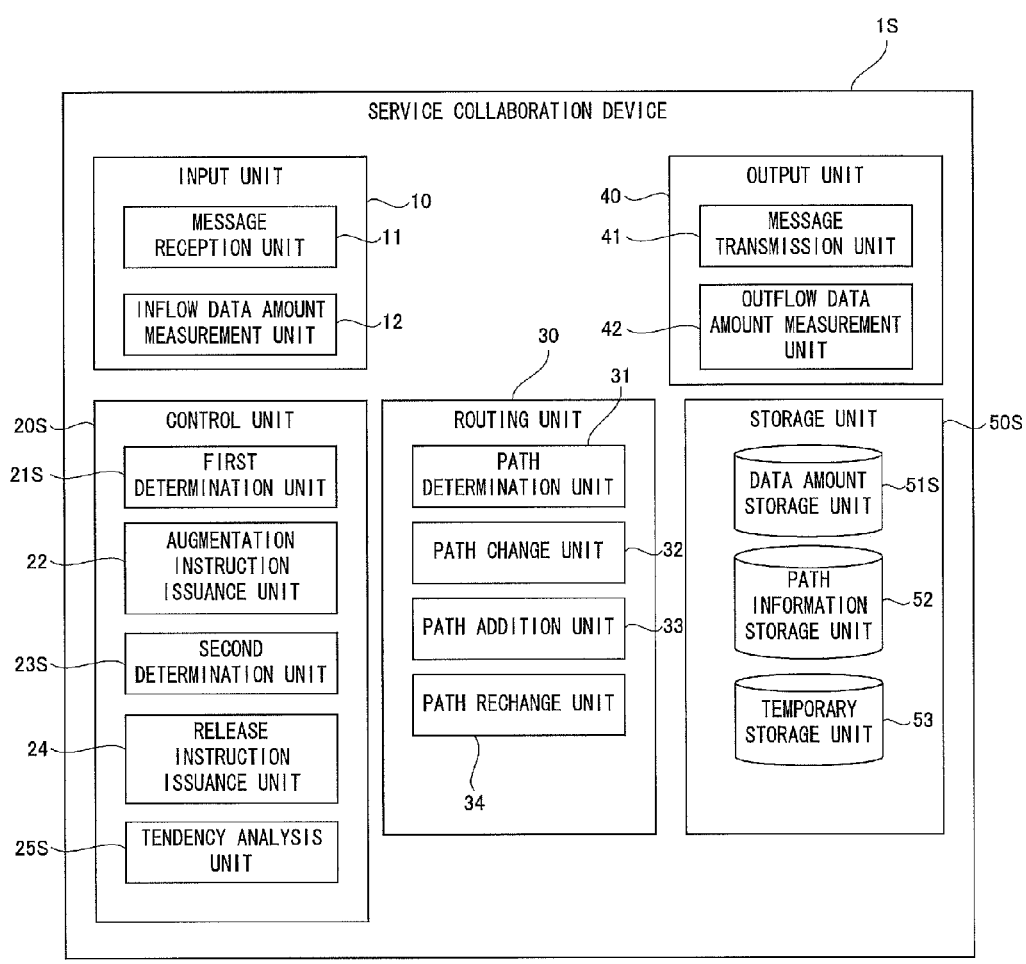
FIG. 13 shows an example of a functional configuration of a service collaboration device according to Second Embodiment.

A description is now given of Second Embodiment of the present invention. First, a configuration of a service collaboration device according to Second Embodiment is explained with reference to FIGS. 13 and 14. FIG. 13 shows an example of a functional configuration of the service collaboration device according to Second Embodiment. FIG. 14 shows an example of the structure of data stored in a data amount storage unit in Second Embodiment.

As shown in FIG. 13, a service collaboration device 1S according to Second Embodiment differs from the service collaboration device 1 according to First Embodiment shown in FIG. 2 as follows. In the service collaboration device 1S, a tendency analysis unit 25S has been added to a control unit 20S, a data item has been added to a data amount storage unit 51S, and the bases for determination by a first determination unit 21S and a second determination unit 23S have been changed.

Other than the above differences, the service collaboration device 1S according to Second Embodiment is configured in a similar manner as the service collaboration device 1 according to First Embodiment. Note that in FIG. 13, the constituent elements that are the same as those in FIG. 2 are given the same reference signs thereas, and a description of such constituent elements is omitted. The following description is given mainly with a focus on the differences from First Embodiment.

As shown in FIG. 14, in Second Embodiment, the data amount storage unit 51S further includes a data item "inflow excess state" in addition to the data items shown in FIG. 3. The data item "inflow excess state" stores information indicating whether or not a message triggered the inflow excess state between the inflow start time and the outflow completion time. In the example shown in FIG. 14, the data item "inflow excess state" stores an identifier (in FIG. 14, "Yes") indicating the occurrence of the inflow excess when the inflow has exceeded the outflow, and an identifier (in FIG. 14, "Nd") indicating no occurrence of the inflow excess when the inflow has not exceeded the outflow.

Furthermore, as shown in FIG. 13, the control unit 20S includes the tendency analysis unit 25S in addition to the constituent elements of the control unit 20 shown in FIG. 2. The tendency analysis unit 25S analyzes data from the past stored in the data amount storage unit 51S to study a relationship between the inflow/outflow data amounts and the inflow excess state.

To be more specific, the tendency analysis unit 25S calculates characteristics of a transition tendency of the inflow data amount and the outflow data amount that have a high possibility of triggering the inflow excess state (hereinafter, "characteristics of inflow excess") by analyzing the inflow data amount and the outflow data amount when the data item "inflow excess state" indicates "Yes". The tendency analysis unit 25S also calculates characteristics of a transition tendency of the inflow data amount and the outflow data amount that have a high possibility of resolving the inflow excess state (hereinafter, "characteristics of resolution of inflow excess") by analyzing the inflow data amount and the outflow data amount when the data item "inflow excess state" indicates "No".

In Second Embodiment, the first determination unit 21S determines whether or not the inflow excess state is triggered based on the characteristics of inflow excess calculated by the tendency analysis unit 25S. More specifically, the first determination unit 21S determines that the inflow excess state is triggered when the characteristics of the transition tendency of the inflow data amount and the outflow data amount targeted for determination exhibit similarity to the characteristics of inflow excess.

Furthermore, in Second Embodiment, the second determination unit 23S determines whether or not the inflow excess state is resolved based on the characteristics of resolution of inflow excess calculated by the tendency analysis unit 25S. More specifically, the second determination unit 23S determines that the inflow excess state is resolved when the characteristics of the transition tendency of the inflow data amount and the outflow data amount targeted for determination exhibit similarity to the characteristics of resolution of inflow excess.

(Device Operations)

Figure 15:
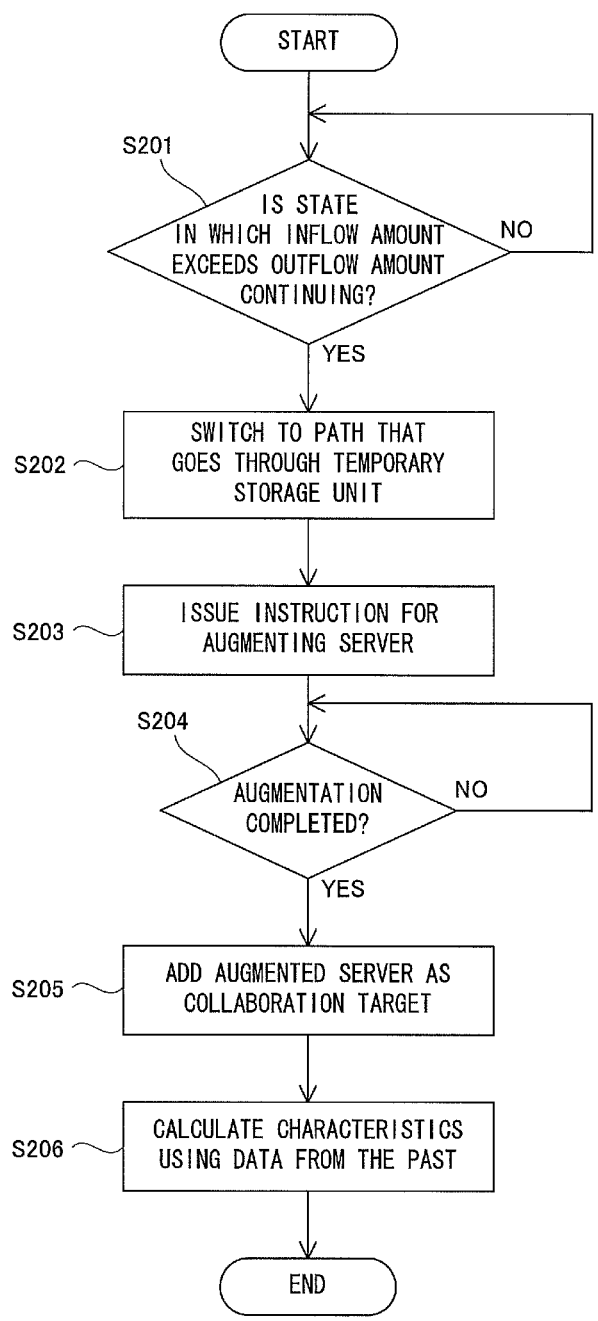
FIG. 15 is a flowchart showing the operations executed by the service collaboration device according to Second Embodiment in an early operational phase of augmentation of a resource.
Figure 16:
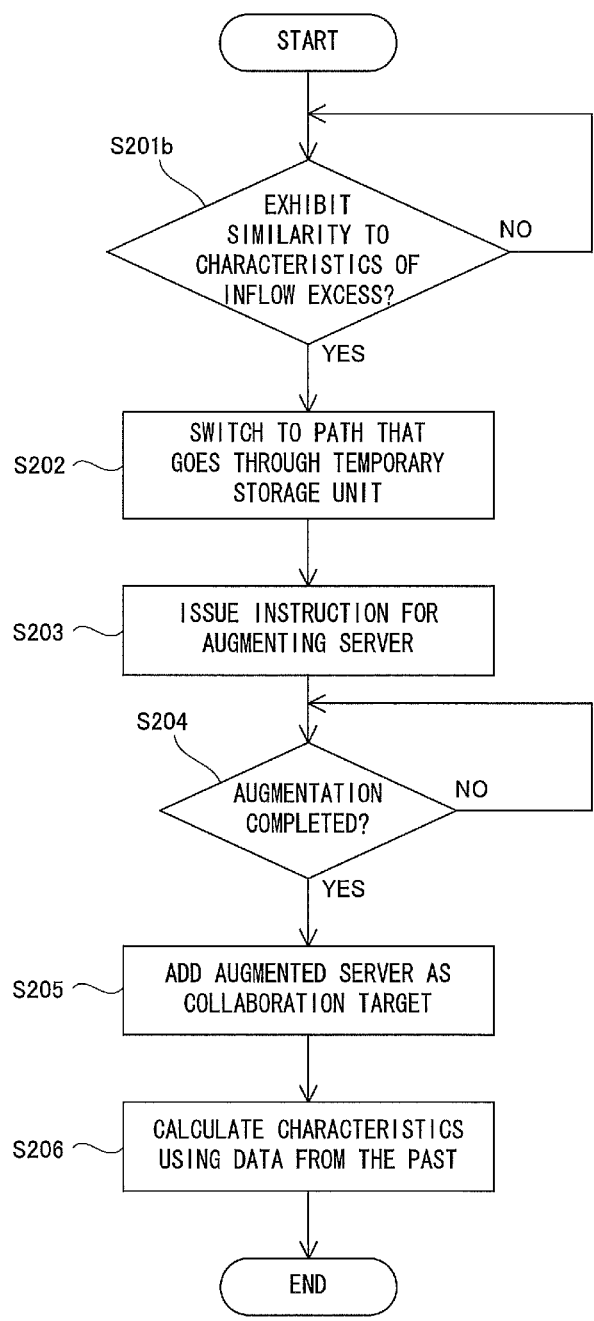
FIG. 16 is a flowchart showing the operations executed by the service collaboration device according to Second Embodiment in a normal operational phase of augmentation of a resource.
Figure 17:
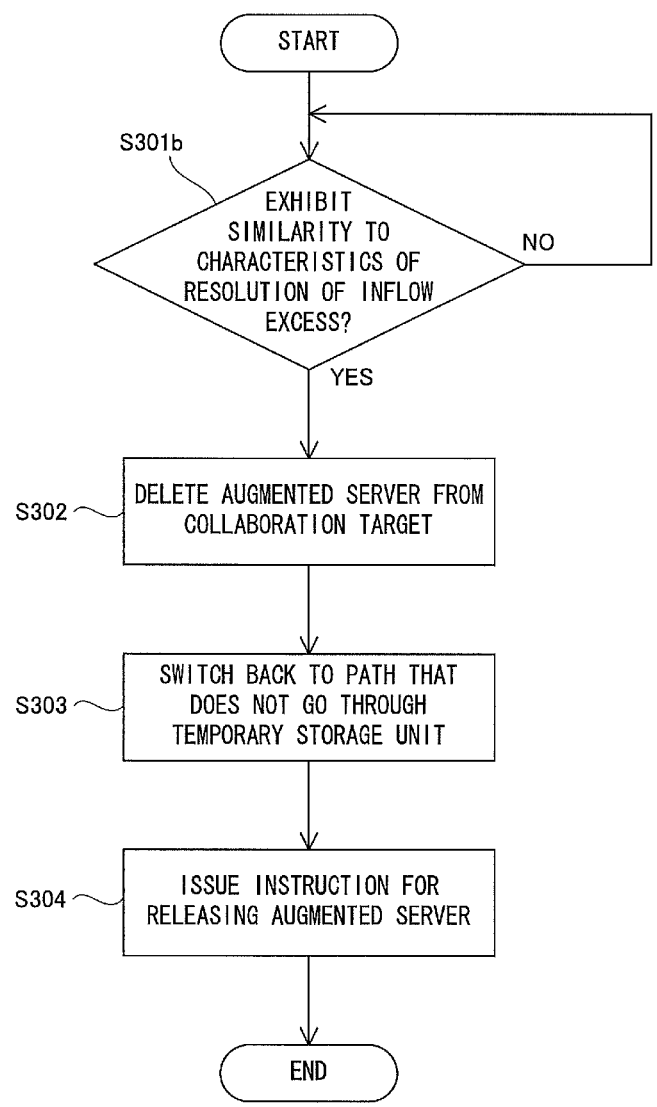
FIG. 17 is a flowchart showing the operations of the service collaboration device according to Second Embodiment for releasing a resource.

The following describes the operations of the service collaboration device 1S according to Second Embodiment with reference to FIGS. 15 to 17. The following description is given in consideration of FIGS. 13 and 14 as appropriate. In Second Embodiment also, the service collaboration method is implemented by causing the service collaboration device 1S to operate. Therefore, a description of the service collaboration method according to Second Embodiment is encompassed within the following description of the operations of the service collaboration device 1S.

First, a description is given of the operations of the service collaboration device according to Second Embodiment for augmenting a resource with reference to FIGS. 15 and 16. FIG. 15 is a flowchart showing the operations executed by the service collaboration device according to Second Embodiment in an early operational phase of augmentation of a resource. In FIG. 15, the operations executed until the number of accumulated results of analysis by the tendency analysis unit 25S equals or exceeds a predetermined number that allows determination of the inflow excess state are shown as the operations in the early operational phase.

As shown in FIG. 15, processes of steps S201 to S205 are executed at first. The processes of steps S201 to S205 are the same as the above-described processes of steps S201 to S205 in FIG. 8. A specific description of steps S201 to S205 in FIG. 15 is omitted.

After the execution of step S205, the tendency analysis unit 25S calculates the characteristics of inflow excess and the characteristics of resolution of inflow excess using the data from the past stored in the data amount storage unit 51S (step S206). Step S206 differs from the operations according to First Embodiment shown in FIG. 8.

FIG. 16 is a flowchart showing the operations executed by the service collaboration device according to Second Embodiment in a normal operational phase of augmentation of a resource. In FIG. 16, the operations executed after the number of accumulated results of analysis by the tendency analysis unit 25S has equaled or exceeded the predetermined number that allows determination of the inflow excess state are shown as the operations in the normal operational phase.

As shown in FIG. 16, after the number of accumulated results of analysis by the tendency analysis unit 25S has equaled or exceeded the predetermined number, the first determination unit 21S determines whether or not the inflow data amount and the outflow data amount targeted for determination exhibit similarity to the characteristics of inflow excess (step S201b). Step S201b differs from the case of the early operational phase shown in FIG. 15.

When the result of determination in the aforementioned step S201b is NO (the NO branch of step S201b), step S201b is executed again after a predetermined time period has passed. On the other hand, when the result of determination in step S201b is YES (the YES branch of step S201b), the path change unit 32 changes the path determined by the path determination unit 31 to a path for transmitting the message to the collaboration target server 3 via the temporary storage unit 53 (step S202). Step S202 shown in FIG. 16 is similar to step S202 shown in FIG. 8.

Thereafter, steps S203 to S206 are executed. The processes of steps S203 to S205 are the same as the above-described processes of steps S203 to S205 in FIG. 8. Also, the process of step S206 is the same as the above-described process of step S206 in FIG. 15. A specific description of steps S203 to S206 in FIG. 16 is omitted.

Next, a description is given of the operations of the service collaboration device according to Second Embodiment for releasing a resource with reference to FIG. 17. FIG. 17 is a flowchart showing the operations of the service collaboration device according to Second Embodiment for releasing a resource.

As shown in FIG. 17, at first, the second determination unit 23 determines whether or not the inflow data amount and the outflow data amount targeted for determination exhibit similarity to the characteristics of resolution of inflow excess (step S301b). Step S301b differs from the operations according to First Embodiment shown in FIG. 9.

When the result of determination in the aforementioned step S301b is NO, step S301b is executed again after a predetermined time period has passed. On the other hand, when the result of determination in the aforementioned step S301b is YES (the YES branch of step S301b), the path rechange unit 34 deletes the augmented server that was added in step S205 of FIG. 15 or FIG. 16 from the collaboration target in the path information storage unit 52 (step S302). Step S302 shown in FIG. 17 is similar to step S302 shown in FIG. 9.

After the execution of step S302, steps S303 and S304 are executed subsequently. The processes of steps S303 and S304 are the same as the above-described processes of steps S303 and S304 in FIG. 9. A specific description of steps S303 and S304 in FIG. 17 is omitted.

(Program)

A service collaboration program according to Second Embodiment may be any program that causes a computer to execute steps S101 to S105 shown in FIG. 7, steps S201 to S206 shown in FIG. 15, steps S201b to S206 shown in FIG. 16, and steps S301b to S304 shown in FIG. 17. The service collaboration device 1S and the service collaboration method according to Second Embodiment can be realized by installing and executing this program on the computer. In this case, a central processing unit (CPU) of the computer functions as the input unit 10, the control unit 20S, the routing unit 30, and the output unit 40 and executes processing thereof. Furthermore, a storage device installed on the computer, such as a hard disk, may function as the storage unit 50S.

(Effects of Second Embodiment)

The service collaboration device 1S according to Second Embodiment achieves the following effects in addition to the effects achieved by the above-described service collaboration device 1 according to First Embodiment. In the service collaboration device 1S according to Second Embodiment, the tendency analysis unit 25S calculates the characteristics of inflow excess and the characteristics of resolution of inflow excess based on data from the past accumulated in the data amount storage unit 51. Based on the calculated characteristics, the first determination unit 21S determines whether or not the inflow excess state is triggered and the second determination unit 23S determines whether or not the inflow excess state is resolved. In this way, the occurrence and resolution of the stalled message can be predicted with a high degree of accuracy based on the record from the past, and therefore the resource environment can be changed more appropriately in accordance with the status of the load.

[Computer Configuration]

Figure 18:
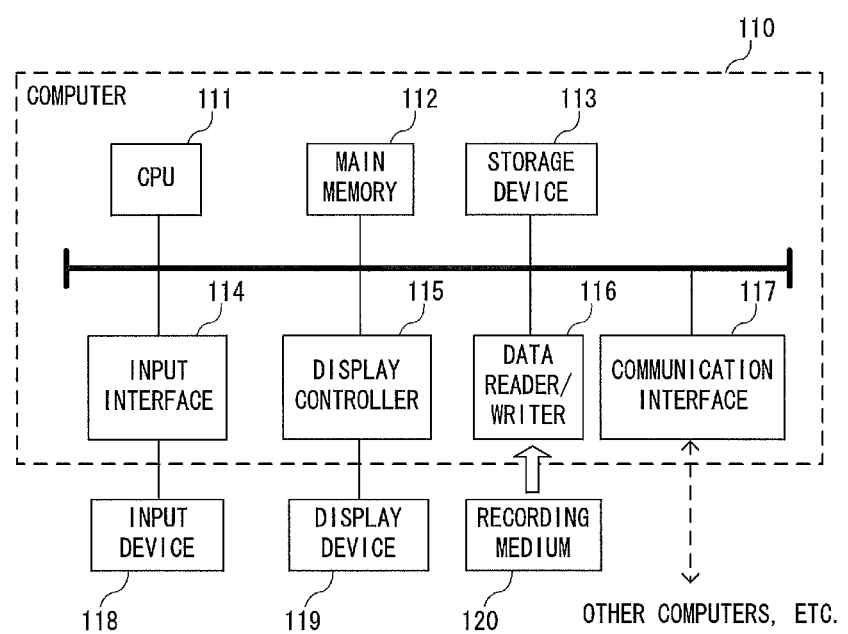
FIG. 18 is a block diagram showing one example of a computer that realizes the service collaboration devices according to First Embodiment and Second Embodiment.

A description is now given of a computer that realizes the service collaboration device by executing the service collaboration programs according to First Embodiment and Second Embodiment with reference to FIG. 18. FIG. 18 is a block diagram showing one example of a computer that realizes the service collaboration devices according to First Embodiment and Second Embodiment.

As shown in FIG. 18, a computer 110 includes a CPU 111, a main memory 112, a storage device 113, an input interface 114, a display controller 115, a data reader/writer 116, and a communication interface 117. These constituent elements are connected via a bus 121 in such a manner that they can perform data communication with one another.

The CPU 111 executes various types of calculation by deploying programs (codes) of the present embodiment stored in the storage device 113 into the main memory 112 and executing these programs (codes) in a predetermined order. As a result, the CPU 111 functions as the input unit 10, the control unit 20 (or 20S), the routing unit 30, and the output unit 40 and executes processing thereof as has been mentioned above.

The main memory 112 is typically a volatile storage device such as a dynamic random-access memory (DRAM). The service collaboration programs according to First Embodiment and Second Embodiment are provided while being stored in a computer-readable recording medium 120. The programs according to First Embodiment and Second Embodiment may be distributed over the Internet connected via the communication interface 117.

Specific examples of the storage device 113 include a hard disk drive and a semiconductor storage device such as a flash memory. The storage device 113 may function as the storage unit 50 (or 50S) as has been mentioned above. The input interface 114 mediates data transfer between the CPU 111 and an input device 118 such as a keyboard and a mouse. The display controller 115 is connected to a display device 119 and controls display on the display device 119.

The data reader/writer 116 mediates data transfer between the CPU 111 and the recording medium 120, reads programs from the recording medium 120, and writes the results of processing of the computer 110 to the recording medium 120. The communication interface 117 mediates data transfer between the CPU 111 and other computers.

Specific examples of the recording medium 120 include a general-purpose semiconductor storage device such as a CompactFlash (CF, registered trademark) and a Secure Digital (SD), a magnetic storage medium such as a flexible disk, and an optical storage medium such as a Compact Disk readonly memory (CD-ROM).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A service collaboration device that transmits a message received from a collaboration source server to a collaboration target server, comprising:
   a first determination unit that determines whether or not the message triggers an inflow excess state based on a data amount of the message received from the collaboration source server and a data amount of the message transmitted to the collaboration target server;
   an augmentation instruction issuance unit that, when the first determination unit has determined that the inflow excess state is triggered, issues an augmentation instruction for augmenting a resource for the collaboration target server to the outside of the augmentation instruction issuance unit;
   a path change unit that, when the augmentation instruction issuance unit has issued the augmentation instruction, changes a path for transmitting the message to the collaboration target server to a path for transmitting the message to the collaboration target server after buffering the message;
   a path addition unit that adds a path for transmitting the buffered message to the resource augmented in accordance with the augmentation instruction;
   a second determination unit that, after the first determination unit has determined that the inflow excess state is triggered, determines whether or not the inflow excess state is resolved based on the data amount of the message received from the collaboration source server and the data amount of the message transmitted to the collaboration target server;
   a release instruction issuance unit that, when the second determination unit has determined that the inflow excess state is resolved, issues a release instruction for releasing the resource augmented in accordance with the augmentation instruction to the outside of the augmentation instruction issuance unit;
   a path rechange unit that, when the release instruction issuance unit has issued the release instruction, deletes the path added by the path addition unit and to restore the path changed by the path change unit back to the path prior to the change;
   a message reception unit configured to receive the message;
   a path determination unit configured to determine the path for transmitting the message to the collaboration target server;
   a message transmission unit configured to transmit the message to the collaboration target server;
   an inflow data amount measurement unit configured to measure the data amount of the message received by the message reception unit as an inflow data amount;
   an outflow data amount measurement unit configured to measure the data amount of the message transmitted by the message transmission unit as an outflow data amount; and
   a data amount storage unit configured to store a start time at which the message reception unit starts reception of the message, a completion time at which the message transmission unit completes transmission of the message, the inflow data amount, and the outflow data amount in association with one another,
   wherein:
   the first determination unit is further configured to determine whether or not the inflow excess state is triggered based on the inflow data amount and the outflow data amount stored in the data amount storage unit,
   when the augmentation instruction issuance unit has issued the augmentation instruction, the path change unit changes the path determined by the path determination unit to the path for transmitting the message to the collaboration target server after buffering the message, and the second determination unit is further configured to determine whether or not the inflow excess state is resolved based on the inflow data amount and the outflow data amount stored in the data amount storage unit.

2. The service collaboration device according to claim 1, wherein the first determination unit determines that the inflow excess state is triggered when a state in which the data amount of the message received from the collaboration source server exceeds the data amount of the message transmitted to the collaboration target server is continuing, and the second determination unit determines that the inflow excess state is resolved when a state in which both the data amount of the message received from the collaboration source server and the data amount of the message transmitted to the collaboration target server are smaller than or equal to a set value is continuing.

3. The service collaboration device according to claim 1, wherein the first determination unit determines whether or not the inflow excess state is triggered based on a tendency of the message to increase between the start time and the completion time stored in the data amount storage unit, and the second determination unit determines whether or not the inflow excess state is resolved based on a tendency of the message to decrease between the start time and the completion time stored in the data amount storage unit.

4. The service collaboration device according to claim 1, wherein:

the data amount storage unit is further configured to store information indicating whether or not the inflow excess state of the message occurs between the start time and the completion time in association with the start time, the completion time, the inflow data amount, and the outflow data amount, when the information stored in the data amount storage unit indicates an occurrence of the inflow excess state, the first determination unit determines whether or not the inflow excess state is triggered based on the inflow data amount and the outflow data amount associated with the information, and when the information stored in the data amount storage unit indicates no occurrence of the inflow excess state, the second determination unit determines whether or not the inflow excess state is resolved based on the inflow data amount and the outflow data amount associated with the information.

5. A service collaboration method for transmitting a message received from a collaboration source server to a collaboration target server, comprising:

(a) a step of determining whether or not the message triggers an inflow excess state based on a data amount of the message received from the collaboration source server and a data amount of the message transmitted to the collaboration target server;

(b) a step of, when step (a) has determined that the inflow excess state is triggered, issuing an augmentation instruction for augmenting a resource for the collaboration target server to the outside of an augmentation instruction issuance unit;

(c) a step of, when step (b) has issued the augmentation instruction, changing a path for transmitting the message to the collaboration target server to a path for transmitting the message to the collaboration target server after buffering the message;

(d) a step of adding a path for transmitting the buffered message to the resource augmented in accordance with the augmentation instruction;

(e) a step of, after step (a) has determined that the inflow excess state is triggered, determining whether or not the inflow excess state is resolved based on the data amount of the message received from the collaboration source server and the data amount of the message transmitted to the collaboration target server;

(f) a step of, when step (e) has determined that the inflow excess state is resolved, issuing a release instruction for releasing the resource augmented in accordance with the augmentation instruction to the outside of the augmentation instruction issuance unit;

(g) a step of, when step (f) has issued the release instruction, deleting the path added by step (d) and restoring the path changed by step (c) back to the path prior to the change;

(h) a step of receiving the message;

(i) a step of determining the path for transmitting the message to the collaboration target server;

(j) a step of transmitting the message to the collaboration target server;

(k) a step of measuring the data amount of the message received in step (h) as an inflow data amount;

(l) a step of measuring the data amount of the message transmitted in step (j) as an outflow data amount; and (m) a step of storing a start time at which step (h) starts reception of the message, a completion time at which step j) completes transmission of the message, the inflow data amount, and the outflow data amount in association with one another, wherein:

step (a) determines whether or not the inflow excess state is triggered based on the inflow data amount and the outflow data amount stored in step (m), when the augmentation instruction has been issued, step (c) changes the path determined in step (i) to the path for transmitting the message to the collaboration target server after buffering the message, and step (e) determines whether or not the inflow excess state is resolved based on the inflow data amount and the outflow data amount stored in step (m).

6. The service collaboration method according to claim 5, wherein step (a) determines that the inflow excess state is triggered when a state in which the data amount of the message received from the collaboration source server exceeds the data amount of the message transmitted to the collaboration target server is continuing, and step (e) determines that the inflow excess state is resolved when a state in which both the data amount of the message received from the collaboration source server and the data amount of the message transmitted to the collaboration target server are smaller than or equal to a set value is continuing.

7. The service collaboration method according to claim 5, wherein step (a) determines whether or not the inflow excess state is triggered based on a tendency of the message to increase between the start time and the completion time stored in step (m), and step (e) determines whether or not the inflow excess state is resolved based on a tendency of the message to decrease between the start time and the completion time stored in step (m).

8. The service collaboration method according to claim 5, wherein step (m) further stores information indicating whether or not the inflow excess state of the message occurs between the start time and the completion time in association with the start time, the completion time, the inflow data amount, and the outflow data amount, when the information stored in step (m) indicates an occurrence of the inflow excess state, step (a) determines whether or not the inflow excess state is triggered based on the inflow data amount and the outflow data amount associated with the information, and when the information stored in step (m) indicates no occurrence of the inflow excess state, step (e) determines whether or not the inflow excess state is resolved based on the inflow data amount and the outflow data amount associated with the information.

9. A non-transitory computer-readable recording medium having recorded therein a program for causing a computer to transmit a message received from a collaboration source server to a collaboration target server, the program including instructions that cause the computer to execute:

(a) a step of determining whether or not the message triggers an inflow excess state based on a data amount of the message received from the collaboration source server and a data amount of the message transmitted to the collaboration target server;

(b) a step of, when step (a) has determined that the inflow excess state is triggered, issuing an augmentation instruction for augmenting a resource for the collaboration target server to the outside of an augmentation instruction issuance unit;

(c) a step of, when step (b) has issued the augmentation instruction, changing a path for transmitting the message to the collaboration target server to a path for transmitting the message to the collaboration target server after buffering the message;

(d) a step of adding a path for transmitting the buffered message to the resource augmented in accordance with the augmentation instruction;

(e) a step of, after step (a) has determined that the inflow excess state is triggered, determining whether or not the inflow excess state is resolved based on the data amount of the message received from the collaboration source server and the data amount of the message transmitted to the collaboration target server;

(f) a step of, when step (e) has determined that the inflow excess state is resolved, issuing a release instruction for releasing the resource augmented in accordance with the augmentation instruction to the outside of the augmentation instruction issuance unit;

(g) a step of, when step (f) has issued the release instruction, deleting the path added by step (d) and restoring the path changed by step (c) back to the path prior to the change;

(h) a step of receiving the message;

(i) a step of determining the path for transmitting the message to the collaboration target server:

(j) a step of transmitting the message to the collaboration target server;

(k) a step of measuring the data amount of the message received in step (h) as an inflow data amount;

(l) a step of measuring the data amount of the message transmitted in step (j) as an outflow data amount; and (m) a step of storing a start time at which step (h) starts reception of the message, a completion time at which step j) completes transmission of the message, the inflow data amount, and the outflow data amount in association with one another, wherein:

step (a) determines whether or not the inflow excess state is triggered based on the inflow data amount and the outflow data amount stored in step (m), when the augmentation instruction has been issued, step (c) changes the path determined in step (i) to the path for transmitting the message to the collaboration target server after buffering the message, and step (e) determines whether or not the inflow excess state is resolved based on the inflow data amount and the outflow data amount stored in step (m).

10. The non-transitory computer-readable recording medium according to claim 9, wherein step (a) determines that the inflow excess state is triggered when a state in which the data amount of the message received from the collaboration source server exceeds the data amount of the message transmitted to the collaboration target server is continuing, and step (e) determines that the inflow excess state is resolved when a state in which both the data amount of the message received from the collaboration source server and the data amount of the message transmitted to the collaboration target server are smaller than or equal to a set value is continuing.

11. The non-transitory computer-readable recording medium according to claim 9, wherein step (a) determines whether or not the inflow excess state is triggered based on a tendency of the message to increase between the start time and the completion time stored in step (m), and step (e) determines whether or not the inflow excess state is resolved based on a tendency of the message to decrease between the start time and the completion time stored in step (m).

12. The non-transitory computer-readable recording medium according to claim 9, wherein step (m) further stores information indicating whether or not the inflow excess state of the message occurs between the start time and the completion time in association with the start time, the completion time, the inflow data amount, and the outflow data amount, when the information stored in step (m) indicates an occurrence of the inflow excess state, step (a) determines whether or not the inflow excess state is triggered based on the inflow data amount and the outflow data amount associated with the information, and when the information stored in step (m) indicates no occurrence of the inflow excess state, step (e) determines whether or not the inflow excess state is resolved based on the inflow data amount and the outflow data amount associated with the information.

* * * * *